(12) United States Patent
Krecke

(10) Patent No.: US 7,028,685 B1
(45) Date of Patent: Apr. 18, 2006

(54) AIR CONDITIONING SYSTEM FOR BUILDINGS AND AIR-CONDITIONED BUILDING, ESPECIALLY A ZERO ENERGY HOUSE

(76) Inventor: Edmond Krecke, route de Grundhof, L-6315, Beaufort (LU)

( * ) Notice: Subject to any disclaimer, the term of this patent is extended or adjusted under 35 U.S.C. 154(b) by 0 days.

(21) Appl. No.: 09/646,017

(22) PCT Filed: Mar. 9, 1999

(86) PCT No.: PCT/EP99/02108

§ 371 (c)(1),
(2), (4) Date: Dec. 18, 2000

(87) PCT Pub. No.: WO99/47865

PCT Pub. Date: Sep. 23, 1999

(30) Foreign Application Priority Data

Mar. 9, 1998 (DE) .................. 198 09 974
Mar. 9, 1999 (DE) .................. 298 04 095 U

(51) Int. Cl.
*F24J 2/00* (2006.01)

(52) U.S. Cl. .................. 126/633; 126/620; 126/621; 165/48.2; 165/53; 52/173.3

(58) Field of Classification Search ............ 126/609, 126/610, 611, 612, 613, 614, 615, 617, 620, 126/621, 628, 629, 632, 633, 714; 52/173.3; 165/48.1, 48.2, 53, 54, 56, 47, 59, 901; 237/46, 237/50, 12; 454/252, 237, 239, 900

See application file for complete search history.

(56) References Cited

U.S. PATENT DOCUMENTS

| | | | | |
|---|---|---|---|---|
| 2,355,495 A | * | 8/1944 | Zier, Jr. .................. 237/55 |
| 2,488,333 A | * | 11/1949 | Schlacter .................. 165/54 |
| 2,680,565 A | * | 6/1954 | Lof .................. 126/591 |
| 4,051,999 A | * | 10/1977 | Granger et al. .................. 126/591 |
| 4,242,872 A | * | 1/1981 | Shaw .................. 62/235.1 |
| 4,244,519 A | * | 1/1981 | Zornig et al. .................. 126/591 |
| 4,285,332 A | * | 8/1981 | McHugh .................. 126/632 |
| 4,295,415 A | * | 10/1981 | Schneider, Jr. .................. 454/185 |
| 4,373,573 A | * | 2/1983 | Madwed .................. 165/236 |
| 4,384,609 A | * | 5/1983 | Neuzil .................. 165/45 |
| 4,408,596 A | * | 10/1983 | Worf .................. 126/630 |
| 4,842,048 A | * | 6/1989 | Higaki .................. 165/45 |
| 5,722,483 A | * | 3/1998 | Gibson .................. 165/54 |
| 6,220,339 B1 | * | 4/2001 | Krecke .................. 165/48.2 |

FOREIGN PATENT DOCUMENTS

| | | | | |
|---|---|---|---|---|
| JP | 59-115925 | * | 7/1984 | |
| JP | 61-262534 | * | 11/1986 | ............ 165/48.2 |
| JP | 62-258938 | * | 11/1987 | ............ 126/633 |
| JP | 63-302232 | * | 12/1988 | |
| JP | 08-189102 | * | 7/1996 | |
| WO | WO 97/10474 | | 3/1997 | |
| WO | WO 97/30316 | | 8/1997 | |

* cited by examiner

*Primary Examiner*—Carl D. Price

(57) ABSTRACT

A method of air-conditioning a building with low heat loss, having the following steps: providing a fresh-air/outgoing-air system for feeding fresh air through a heat accumulator being located beneath said building and extracting said outgoing air through the heat accumulator; routing the fresh-air and the outgoing air in first and second tubes, where the first tubes are nested in the second tubes so as to recover heat energy present in the outgoing air.

4 Claims, 6 Drawing Sheets

AIR CONDITIONING SYSTEM FOR BUILDINGS AND AIR-CONDITIONED BUILDING, ESPECIALLY A ZERO ENERGY HOUSE

The invention relates to a method and systems for air-conditioning buildings with low heat loss according to the preamble of claims 1 and 2, and also to a low-energy house, in particular a zero-energy house, according to the preamble of claim 18.

WO 97/10 474 has disclosed an energy system for buildings using solar absorbers, heat exchangers and heat accumulators in order to heat, or to cool, a building passively it required. In addition to the transmission heat losses in the winter from the inside of the building (and the transmission heat gains during the summer), there are also ventilation heat losses during the winter and undesired heating up in the summer. In the winter, this ventilation heat loss together with the transmission heat loss determines the heat requirement of a building. In order to satisfy the requirements of the Fraunhofer Institute and/or the heat insulation regulation (Germany) for so-called "zero-energy houses", the ventilation heat losses in a building have to be kept as low as possible. (Zero-energy houses are, by definition, buildings with a heat dissipation of less than 20 KW m$^2$/year.) Furthermore, it is also desirable to go below such low heat dissipation values.

The exterior walls of the building described in WO 97/10 474 comprise an inner concrete layer and an outer insulating-material layer (in addition to layers of plaster), and the heat energy is fed to the solid wall, which is virtually as warm as the interior. In order to satisfy the requirements of the Fraunhofer Institute and/or the heat insulation regulation (Germany) for so-called "zero-energy houses", it would also be desirable for it to be possible to use low-temperature energy (below the room temperature) for heating purposes, in order thus for it also to be possible to utilize heat accumulators or heat stores with a lower temperature than the room temperature of the building which is to be heated.

Consequently, the object of the invention is to specify air-conditioning methods and systems for buildings by means of which it is possible to minimize the heat loss of buildings. It would also be desirable to specify building structures in order for it to be possible to introduce low-temperature energy (i.e. heat with temperature values below room temperature) for heating purposes.

The set object is achieved, in an extremely straightforward and intelligent manner, by the method steps of claim 1 and the combination of features of claim 2, and is configured and developed further by the rest of the features of the dependent claims.

The invention provides a fresh-air/outgoing-air system which forms a counterflow heat-exchanging device. The heat energy present in the outgoing air is largely recovered. The fresh-air/outgoing-air system is additionally connected to a heater accumulator, which is preferably positioned beneath the building, in order to dissipate excess energy to said heat accumulator or to take in heat energy therefrom, in order correspondingly to control the temperature of the fresh-air introduced into the building.

Use of heat with temperature values below the room temperature of the building which is to be heated is made possible by the features of claim 18, and is developed further by the rest of the features of the claims dependent on claim 18. The low temperature of the heat transfer medium can be utilized particularly advantageously for cooling purposes during relatively warm or hot periods, e.g. in the tropics.

By means of the invention, the heat energy of a low-temperature heat accumulator is introduced into the core zone of the exterior concrete walls. In the center of the exterior wall, the temperature has a value below room temperature, with the result that, by virtue of the core temperature being raised, it is possible to realize a distribution of heat in the wall which results in an increase in the interior temperature although the heat-energy transfer medium fed has a temperature ("flow temperature") which is below room temperature.

According to the invention, use is preferably made of a symmetrical heat insulation, in contrast to the otherwise conventional asymmetrical heat insulation (exterior heat insulation), in order to provide, by way of this symmetrical construction, an air-conditioning barrier, preferably in the form of load-bearing masonrywork.

This means that, for example in a household which has four occupants, an interior gain in energy of approximately 2500 kWh/year dissipates said heat energy as sparingly as possible to the concrete core, i.e. to the air-conditioning barrier. It is particularly advantageous for said concrete core never to be at winter temperatures, i.e. its temperature is never below 0° C. This means that, in the interior of a building according to the invention, always at least spring-time temperatures prevail even without additional heating. The heat loss of the concrete core in respect of the low outside temperature, however, is essentially cost-free since said heat loss is covered by the heat accumulator.

The invention will be described in more detail with reference to preferred embodiments and by way of the attached drawing, in which:

FIG. 1 shows a house with some of the equipment as has been described, for example, in WO 97/10 474 as well as additional air-conditioning devices which are integrated into the systems of the existing house.

Figure 1:
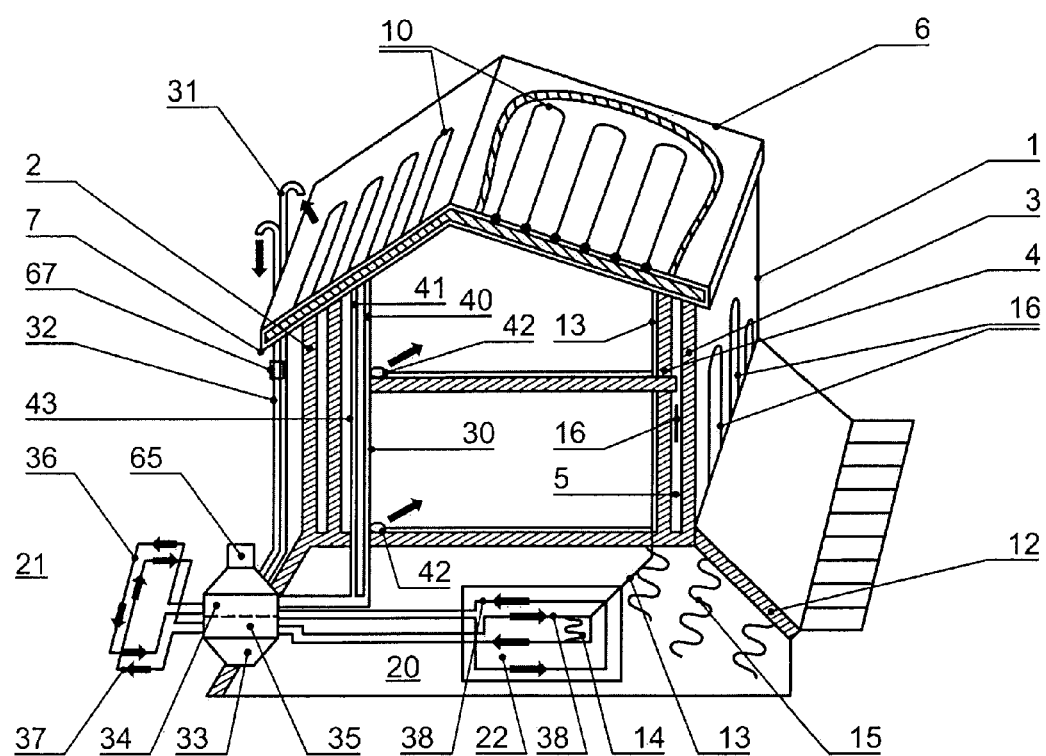
FIG. 1 shows a schematic cross section through a zero-energy house with air-conditioning devices according to the invention.

The building 1 has exterior walls 2, which comprise an outer heat-insulating layer 3, an inner heat-insulating layer 4 and a core zone 5 as structure-supporting layer, i.e. as a load-bearing wall, in particular as a load-bearing concrete wall.

The roof 6 comprises a load-bearing structure 7, an insulating layer 8 and a roof covering 9, which may be constructed from roof tiles or other known roof materials and should be as dark as possible. Beneath the roof covering 9, in a preferred embodiment of the invention, heat absorbers 10 are arranged, for example, in grooves and/or between the counter-battens of the insulating layer 8, said counter-battens being located above the insulating layer.

It also lies within the context of the invention, in further preferred embodiments, without the solar or heat absorbers, to utilize only the actual introduction of energy by solar irradiation of the building itself, if this is possible as a result of the local climatic conditions and of the energy dissipated within the building during utilization of the building.

The house has a foundation base slab 11, which in this case, in order to simplify the illustration, is depicted as being level with the ground. A heat-insulating layer 12 is shown as being routed obliquely outward and into the ground from said base slab 11, the heat-insulating layer 12 delimiting beneath the building 1 a so-called geothermal heat accumulator 20 in relation to the surrounding earth 21. There is a thermal build-up here of the rising geothermal energy as a result of the building 1.

The heat accumulator 20 comprises a higher-temperature central region 22, this being aided by heat being fed to this location. 20° C. and above is achieved on a permanent basis. In specific terms, fluid-channeling devices comprising connecting lines 13 are provided from the solar absorber 10 to heat exchanger coils 14, 15, which are charged in dependence on the temperature in the solar absorber 10. In embodiments without solar absorbers, the heat energy absorbed in the building walls is sufficient for the required introduction of energy.

The fresh-air/outgoing-air system 30 comprises a fresh-air line 31 and an outgoing-air line 32, which lead to a three-way valve 33. These lines advantageously lead, on the southwest exterior wall of the building, if appropriate to above the roof, in order to allow fresh-air to flow into the building which is heated up by the sun, if appropriate via the metal fresh-air line, and in order to channel away the outgoing air. These lines may be provided with a characteristic stamp in the manner of a trademark for an air-conditioned "zero-energy house". The three-way valve 33 has two levels 34 and 35 per suction-extraction region (flat, house, building wing), of which the level 34 is assigned to the distribution of fresh-air and the level 35 is assigned to the distribution of outgoing air. In this arrangement, the outgoing air is channeled away via the line 32 and the fresh-air is fed to the level 34 via the line 31. From these levels 34, 35, buried pipelines 36 and 37 lead into the earth 21, said buried pipelines 36, 37 being routed one inside the other via pipe-wall lead-throughs illustrated in FIG. 4, i.e. forming pipe loops which advantageously lead around the house via the heat-insulating layer 12.

Figure 4:
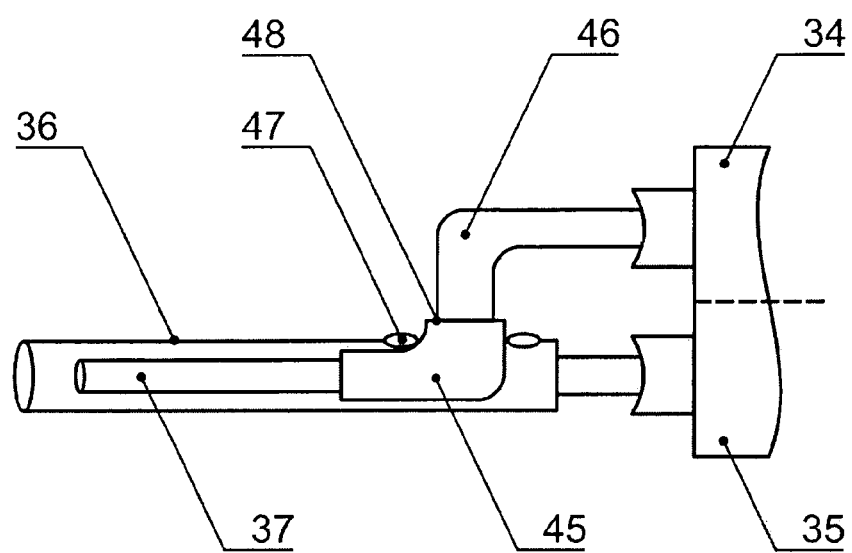
FIG. 4 shows a pipe-wall lead-through, FIG. 5 shows a facade.

FIG. 4 shows a pipe-wall lead-through comprising two pipe bends 45 and 46 and a sealing sleeve 47, which seals the gap between the pipe bend 45 and the transverse pipe-wall opening 48.

From the levels 34 and 35, heat accumulator lines 38 and 39 also lead into the central region 22 of the heat accumulator 20, to be precise these pipelines are also routed one inside the other, as is the case with the pipelines 36, 37.

Although the pipelines are illustrated as being round by way of example, the invention is not restricted to this, and use may also advantageously be made of rectangular, polygonal or elliptical cross sections, the same applying to the mixer, which may also be realized in square or rectangular form with an inner pipe/outer pipe structure, with the result that, instead of a rotary movement, it is also possible to use a sliding or lifting movement.

Finally, from the levels 34, 35, a fresh-air room line 40 and an outgoing-air suction line 41 lead into the interior of the building in order here to achieve, in contrast to the conventional positive pressure in ventilation systems, an advantageous regulated negative pressure. The fresh-air line has fresh-air inlets 42 in the region of the skirting-boards, and the outgoing-air suction line has outgoing-air suction openings 43 in the vicinity of the ceilings. Said outgoing-air suction openings are provided with nonreturn valves, in order to disengage the outgoing-air system in the case of ventilation of the respective room. Provided in adaptation to the size, the nature and the air loading of the respective room are sets of fixed orifice plates, of which an appropriate size is inserted into the fresh-air branching means of the respective room in order to calibrate the fresh-air stream fed.

Figure 2:
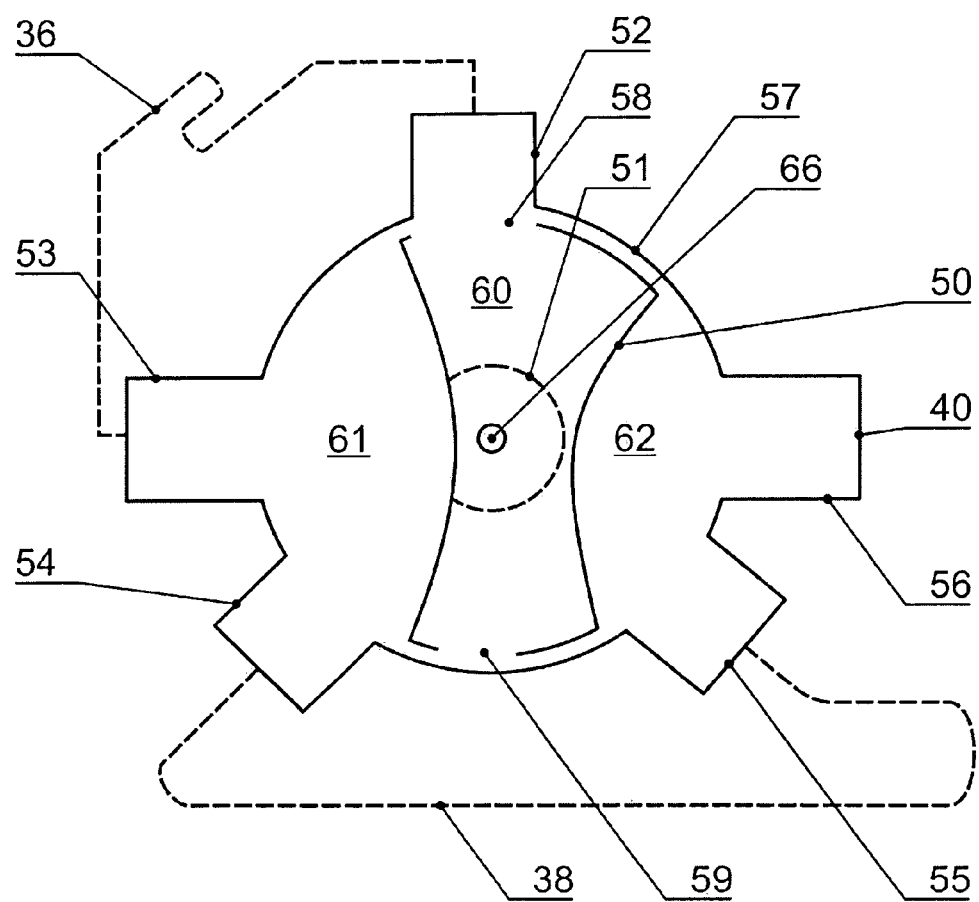
FIG. 2 shows a three-way valve in the winter position.
Figure 3:
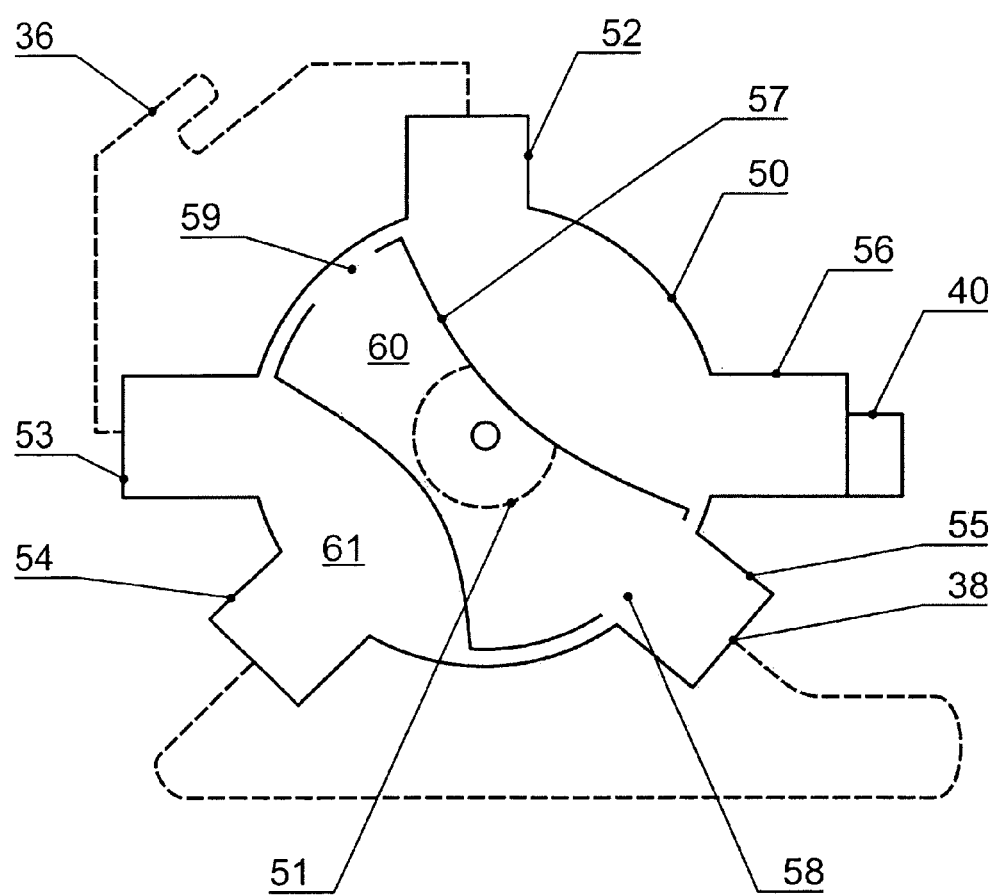
FIG. 3 shows the three-way valve in the summer position.

FIGS. 2 and 3 give a schematic illustration of the level 34 of the three-way valve 33. The latter contains a cylindrical/conical casing 50 with six connections 51 to 56, of which the connection 51 runs in the axial direction and feeds the fresh-air, while the rest of the connections 52 to 56 run radially. The connection 52 is connected to the connection 53 via the pipeline 36, the connection 54 is connected to the connection 55 via the pipeline 38, and the connection 56 is connected to the line 40. Provided within the casing 50 is a rotary slide 57 with two orifice-plate openings 58 and 59, which can be made to coincide, or partially coincide, with the connections 52 and 55. FIG. 2 shows a winter position and FIG. 3 shows a summer position. The rotary slide 57 has an interior space 60 which is open in the upward direction and to which the fresh-air is fed via the connection 51. In the winter position of FIG. 2, the fresh-air flows, via the buried pipelines 36 and the connection 53, into a covered chamber 61 of the three-way valve 33 and from there, via the connection 54 and the heat-accumulator line 38 and the connection 55, into a further covered chamber 62 of the valve and from there, via the connection 56, into the fresh-air line 40 into the interior of the building 1. As far as the level 35 of the three-way valve 33 is concerned, the flow direction is precisely the opposite. The outgoing-air suction line 41 opens out, via the connection 56, into the chamber 62 and the outgoing air passes from there, via the connection 55, the line 38 and the connection 54, into the chamber 61 and from there, via the connection 53 and the line 37, to the connection 52 and from there, via the chamber 60 of the level 35, into the outgoing-air line 32. Fresh-air and outgoing air are thus routed in counterflow, as far as possible all the sections 36/37, 38/39 and 40/41 being designed as pipelines which are routed at least partially one inside the other. The fresh-air thus emerges at 42 at a temperature which corresponds more or less to the outgoing air extracted by suction.

The summer operation is illustrated with reference to FIG. 3. Fresh-air, which may be of elevated temperature in the summer, is fed, in turn, via the connection 51. This fresh-air passes, via the orifice-plate opening 58 and the connection 55, into the heat-accumulator line 38 and, via the connection 54 into the chamber 61 and, via the connection 53 and the buried pipeline 36, to the connection 52 and the chamber 62. The latter is connected, via the connection 56, to the fresh-air line 40, which leads into the interior rooms which are to be air-conditioned. From there, the outgoing air passes in counterflow, via the line 41, the buried pipeline 37 and the heat-accumulator line 39, to the interior space 60 of the level 35 of the three-way valve 33 and, via the outgoing-air line 32, into the open.

The rotary slide 57 can be switched into the two positions illustrated. Accordingly, there is an actuating motor 65 in order for it to be possible to adjust the desired position of the rotary slide 57 via a shaft 66. The orifice-plate openings 58 and 59 make it possible to coincide partially with associated connections if a stepping motor is selected.

FIG. 1 also depicts schematically an extractor fan 67, as suction-extraction device, which is effective in respect of the line 32 and forces the outgoing air toward the outside. This produces a negative pressure in the building 1, which allows outside air to flow in constantly through joints in windows and doors. Since this extraneous air is not heated by the fresh-air/outgoing-air system 30 in the winter, it is sought to design the doors and windows with the lowest possible level of sealing losses. In zero-energy houses, frameless windows which cannot be opened are preferred.

The extractor fan 67 is assigned an actuating element, e.g. potentiometer, which is arranged in the interior of the building 1 and makes it possible for the rotational speed of the fan 67 to be regulated via a control line. Such potentiometers or [lacuna] may be installed either in respect of the building as a whole or room by room. In the latter case, it is also possible to increase the size, in accordance with the potentiometer adjustment, of an outlet or inlet flow opening of the air-conditioning device of the room in question in each case. This makes it possible for the air stream to be adjusted in accordance with the immediate requirements.

It is likewise within the context of the invention, instead of the potentiometer, to use electronic regulating devices which regulate a predetermined room temperature by way of the flowing air quantity.

In order to assist the temperature regulation, i.e. either for more rapid heating or for heating in the case of a cold heat accumulator for example with completion of construction work toward the end of the year, it is also possible to arrange in the supply-air line an electric heating element, as is known for example to the person skilled in the art from electric fan heaters. It is possible either for one such additional heating device to be provided for the entire building or for one to be provided in each room of the building. Such additional heaters can be obtained in a variety of different forms (electric, with gas, oil, inter alia). In general, however, the need for electrical heating energy will be considerably smaller than in conventional air-conditioning methods.

In the interior of an occupied house, there are heat sources (cooker, lights, electrical appliances, inter alia) of which the thermal power is in the order of magnitude of the transmission heat losses if the insulating-material thickness of the layers 3 and 5 is around 25 centimeters and overall coefficients of heat transfer of 0.14 W/m$^2$K are reached. With the outside temperature of −16° C., which is unusual for Central Europe, and a temperature difference of +40 and +38 and +32° C. between the inside and outside, a core temperature of +4.5 and +3.5 and +0.4° C. is calculated if layer thicknesses of 12 cm on the inside and 13 cm on the outside are selected. With layer thicknesses of 10 cm on the inside and 15 cm on the outside, core temperatures of +7.6 and +6.4 and +2.85° C. are reached. From the region of the heat accumulator 20, fluid lines 15 lead into said core layer 5, these being indicated schematically at 16. Alternatively, it is also possible for the fluid lines to be arranged partially or wholly in one of the, preferably Styropor-containing, heat-insulating layer 3 or heat-insulating layer 4.

At a depth of approximately 2 m, the earth, in Central Europe, has a temperature of between +7 and +9° C. By virtue of the heat accumulator 20 being placed in position, a higher average temperature is reached on account of the geothermics and because energy is fed to said heat accumulator in the summer. Accordingly, the core layer 5 may be fed heat from the accumulator 20 in order for said core layer to be heated up to from +9° C. to +15° C. This produces, in the exterior wall 2, a heat which is noticeable for the interior of the building as a reduced heating requirement and which regulates the inside temperature to the desired adjustable temperatures. An extremely small heat pump or else the heater described above may additionally be arranged in the air-conditioning system.

The fluid lines 16 laid in the core layer 5 can dissipate heat, via the coils 15, to the heat accumulator 20 in the summer. The same applies to the solar absorbers 10, which are preferably connected to the core region 22 of the heat accumulator 20 in order to dissipate excess heat there.

The controlled room ventilation which is possible using the air-conditioning system not only ensures comfortable interior climatic conditions, but also reduces the heat requirement for the building by a considerable level. This makes it possible to go considerably below the requirements of the Fraunhofer Institute, Germany, for zero-energy houses.

Figure 5:
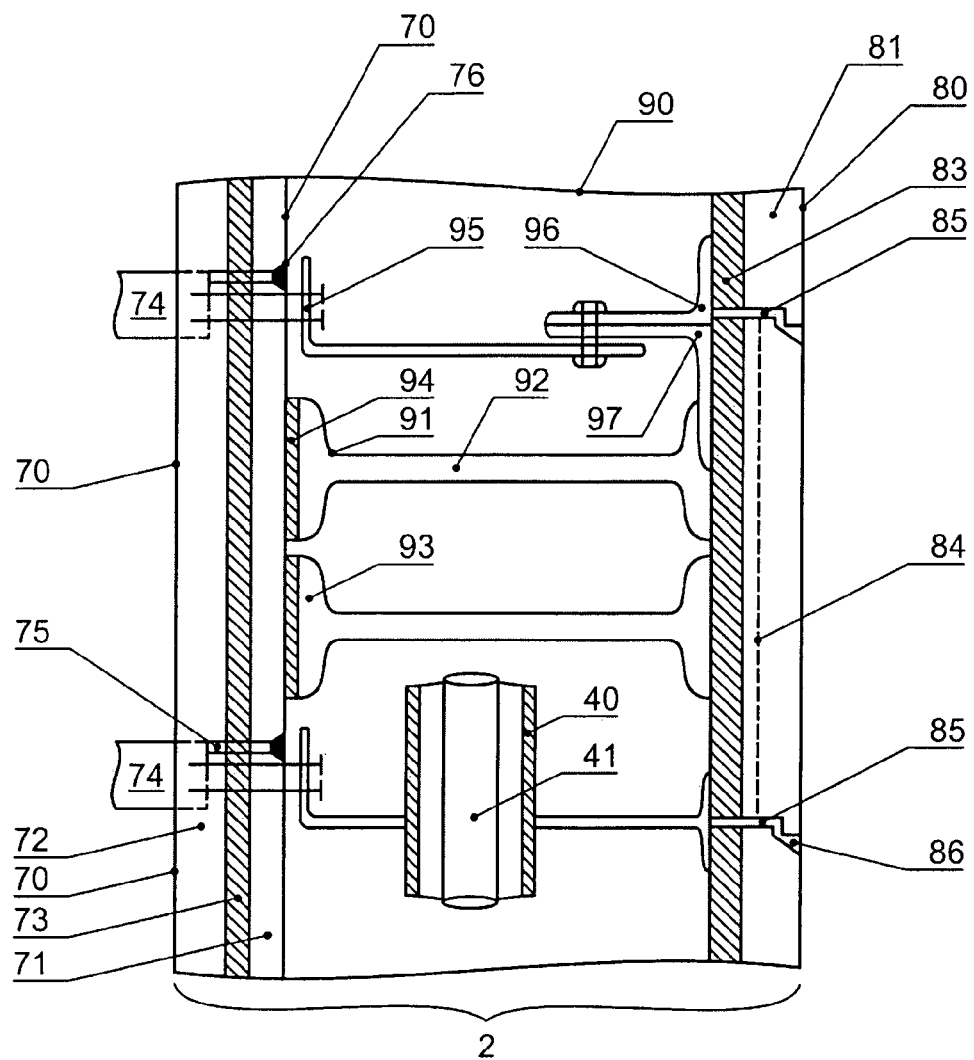

The air-conditioning of buildings according to the invention can also be realized in the refurbishment of old buildings, in particular of slab construction. Such a slab wall is illustrated at 70 in FIG. 5 and contains an outer concrete slab 71, an inner concrete slab 72 and an insulating layer 73. Intermediate floors are indicated at 74. In the regions of these stories, there are usually joints 75 between the individual story slabs 70, which in this case are seated flush one upon the other. The joints run horizontally and are widened conically at the outlet in order to accommodate a sealing compound. It has been found that the constant heating and cooling does not keep said sealing compound sealed on a permanent basis, with the result that water running down the facade passes into the insulating-layer zone 73 by capillary action and dampens said insulating-layer zone. A further problem arises in that the dew-point zone is likewise situated in the insulating-layer zone 73, because the heat insulation of the concrete layers 71 and 72 does not correspond to the physical requirements. Going below the dew point results in water being precipitated in the insulating zone 73, as a result of which the thermal transmission of the latter increases. This means, however, that the dew-point zone is displaced further toward the interior of the building, that is to say toward the layer 72, with the result that the entire insulating-material layer 73 is gradually soaked through. This results not only in a pronounced reduction in the heat-insulating value of said slab structures, but also in corrosion damage to connecting members or the like between the two concrete layers 71 and 72. This results not only in enormous corrosion damage.

The air-conditioning method according to the invention can be used not just for modernizing such old buildings but also for refurbishing them. Facade panels 80 are positioned, at a distance in front of the facade of the old building, on a strip foundation which surrounds the existing old building and is provided with a heat-insulating layer 12 in the manner of FIG. 1. The heat accumulator 20 will be provided beneath said heat-insulating layer 12 and the existing old building, and heat is fed to said accumulator, in the manner already described, by the geothermics, the solar absorbers and the outgoing air. The new facade panels 80 contain an outer concrete layer 81 and an inner heat-insulating layer 83 of sufficient thickness for the entire exterior wall 2 to be classified as having pronounced heat-insulating properties, that is to say it has to have values of from 40 to below 20 KW m$^2$/year. Since the concrete layer 81 need not bear any story walls, it may be produced from lightweight concrete (Bio-Por-Beton)®, which has considerable heat-insulating properties. This results in the dew point being situated within the concrete zone 81 and being capable of advancing to the maximum limit depicted at 84. The displacement of the dew point in concrete, and porous concrete in particular, has the advantage that concrete can store a certain quantity of water without resulting in any adverse effects. Moreover, a state of equilibrium is established via diffusion.

In order to protect the insulating-material layer 83 against the penetration of moisture, the joints between the individual panels 80 are of stepped design with a slope in the downward direction, it being possible for a sealing strip to be positioned in the planar section and for a sealing compound 86 to be anchored well in the widening and downwardly directed part.

Extending between the slabs 70 of the old building and the panels 80 of the new facade is a ventilation space 90, through which the fresh-air line 40 and the suction-extraction line 41 are routed. Of course, it is also possible to route further lines, as have been discussed in conjunction with FIG. 1, and further supply lines, which need not be associated with the air-conditioning. The pipes are routed through the interspaces of dumbbell-shaped spacers 91 which, although having relatively thin crosspieces 92, have large-surface-area plate-like connecting surfaces in order for it to be possible to provide reliable interconnection with adjacent elements. Old buildings, in particular slab structures of the former Eastern Bloc have usually not been produced with the desired precision encountered in market economies, for which reason the new facade panels 80 are not just laid parallel to the existing buildings, but are also positioned vertically and horizontally using laser measurement. For this purpose, it may be necessary for shins to be adhesively bonded to the exterior wall of the old building and to allow the dumbbell-shaped connecting element 91 to be connected thereto.

During construction of the new facade, moreover, work is carried out expediently from story to story. Use is made of angle elements 95, 96, 97 which overlap and, in the overlap region, have slots, in order for it to be possible to maintain the correct distance between the old building and the new facade. The angle elements 95 are anchored in the region of the intermediate floors 74, which, at the same time, additionally secures the outer concrete slabs 71 of the old building. The angles 96 and 97 are screw-connected using heavy-duty connectors.

The invention can be extended in further respects. It is possible for the fresh-air feed system to be equipped with filter devices, for example with activated carbon filters, ozone filters, insect filters, pollen filters and bacteriological or virus filters. Furthermore, the suction-extraction device may be operated in accordance with the respective requirements, that is to say sensors which bring about supply-air and outgoing-air regulation may be provided in the rooms which are to be air-conditioned. In this context, it is possible to provide, in the suction-extraction opening, a smoke alarm which, when it operates, blocks at least the fresh-air feed line to the fresh-air inlets of the room. As is known, fires in rooms flare up when oxygen is given unobstructed access by virtue of a door or a window being opened. While the extraction of smoke by suction constitutes a desirable property of the system, in the case of relatively large air-inlet cross sections into the room first of all the suction-extraction capacity will be increased in order to generate a relatively pronounced negative pressure since, as is known, there is virtually no possibility of fire without oxygen. Furthermore, it is also possible for the suction-extraction line to be blocked in order for the air exchange to be kept as low as possible and thus for the fire to be smothered as far as possible.

The system may also be equipped as a burglary-prevention system. If a room is breached by force from the outside, the negative pressure in this room changes on account of the "infiltrated-air feed". The nonreturn valve on the suction-extraction connector is activated as a result and if, in the operating position, a switch is actuated, this can be indicated to a security center. Depending on the requirements, the system can be armed or, if it is desired to ventilate the room, disarmed.

In Central Europe, the outside air is, on average, far below room temperature, with the result that the absolute humidity fed into the interior with the fresh-air results in relatively dry air. In the heat-exchanging devices according to the invention, in particular in ground duct-pipe in pipe structures, condensation is avoided since the temperature difference between fresh-air and outgoing air is usually outside the dew point. This is not the case with conventional one-way ground duct ventilation systems.

The counterflow heat-exchanging device may be configured such that some of the moisture channeled out with the outgoing air is recovered and the fresh-air is added. When the outgoing air becomes cooler and cooler as it moves through the heat-exchanging device, there is a drop below the mist-forming point, and the mist which forms can pass into the fresh-air stream by way of a suitable diffusion device. An example of such a diffusion device which may be used is a rotatable, cylindrical foam body, of which one lateral side is arranged in the outgoing air and the other lateral side is arranged in the fresh-air. On the outgoing-air side, the foam body becomes covered with moisture and, following rotation into the fresh-air side, this moisture evaporates. It is also possible to use other rehumidifying devices. The negative pressure avoids the situation where room humidity, by penetrating into components, results in undesired condensation, as a result of which structural damage is avoided.

Figure 6:
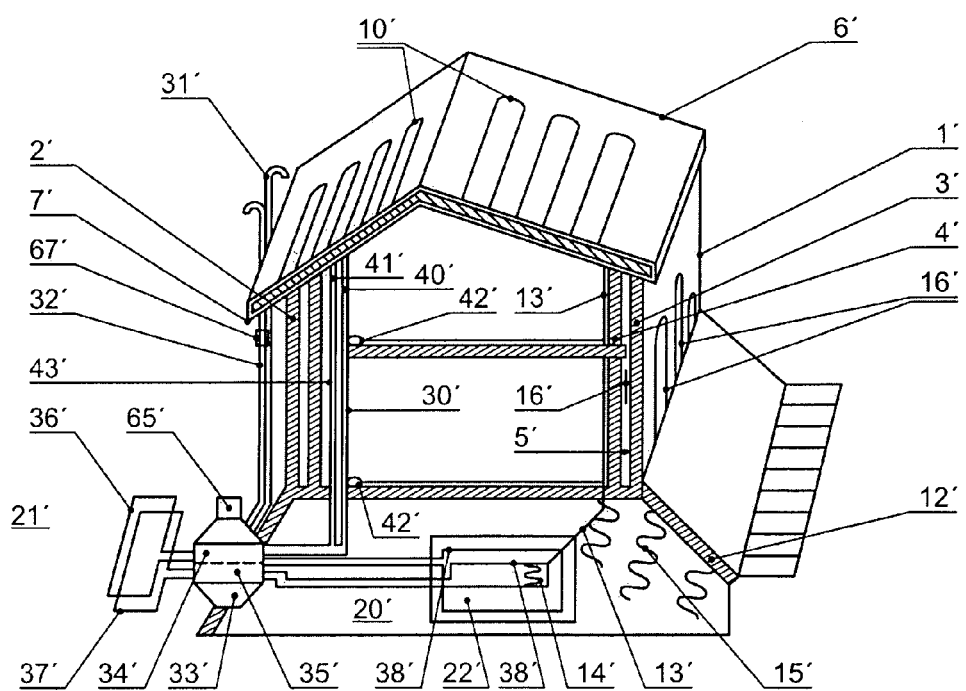
FIG. 6 shows a schematic cross section through a zero-energy house.

FIG. 6 shows a house of a further preferred embodiment according to the invention with some of the equipment as has been described in WO 97/10 474 as well as additional air-conditioning devices which are integrated in the systems of the existing house.

The building 1' has exterior walls 2', which comprise an outer heat-insulating layer 3', an inner heat-insulating layer 4' and a core zone 5' as a load-bearing wall, preferably as a concrete wall. The roof 6' comprises a load-bearing structure 7', an insulating layer 8' and a roof covering 9', which may be constructed from roof tiles or other known roof materials and should be as dark as possible. Beneath the roof covering 9', heat absorbers 10' are arranged, for example, in grooves of the insulating layer 8' or between the counter-battens or between the [lacuna]. The house has a base slab 11', which in this case as well, in order to simplify the illustration, is depicted as being level with the ground. A heat-insulating layer 12' is shown as being routed obliquely outward and into the ground from said base slab 11', the heat-insulating layer 12' delimiting beneath the building 1' a so-called geothermal heat accumulator 20' in relation to the surrounding earth 21'.

There is a thermal build-up here of the rising geothermalenergy as a result of the building 1'. The heat accumulator 20' comprises a higher-temperature central region 22', this being aided by heat being fed to this location. 20° C. and above is achieved on a permanent basis. In specific terms, fluid-channeling devices including connecting lines 13' are provided from the solar absorber 10' to heat-exchanger coils 14', 15', which are charged in dependence on the temperature in the solar absorber 10'.

The fresh-air/outgoing-air system 30' comprises a fresh-air line 31' and an outgoing-air line 32', which lead to a directional control valve 33'. These lines advantageously lead, on the southwest exterior wall of the building, if appropriate to above the roof, in order to allow fresh-air to flow into the building which is heated up by the sun, if appropriate via the metal fresh-air line, and in order to channel away the outgoing air. These lines may be provided with a characteristic stamp in the manner of a trademark for an air-conditioned "zero-energy house". The directional control valve 33' has two levels 34' and 35' per suction-extraction region (flat, house, building wing), of which the level 34' is assigned to the distribution of fresh-air and the level 35' is assigned to the distribution of outgoing air. In this arrangement, the outgoing air is channeled away via the line 32' and the fresh-air is fed to the level 34' via the line 31'. From these levels 34', 35', buried pipelines 36' and 37, lead into the earth 21', said buried pipelines 36', 37' being routed one inside the other via pipe-wall lead-throughs, i.e. forming pipe loops which advantageously lead around the house via the heat-insulating layer 12'.

From the levels 34' and 35', heat-accumulator lines 38' and 39' also lead into the central region 22' of the heat accumulator 20', to be precise these pipelines are also routed one inside the other, as is the case with the pipelines 36', 37'.

Finally, from the levels 34', 35', a fresh-air room line 40' and an outgoing-air suction line 41' lead into the interior of the building. The fresh-air line has fresh-air inlets 42' in the region of the skirting-boards, and the outgoing-air auction line has outgoing-air suction openings 43' in the vicinity of the ceilings. Said outgoing-air suction openings are provided with nonreturn valves, in order to disengage the outgoing-air system in the case of ventilation of the respective room. Provided in adaptation to the size, the nature and the air loading of the respective room are sets of fixed orifice plates, of which an appropriate size is inserted into the fresh-air branching means of the respective room in order to calibrate the fresh-air stream fed.

FIG. 6 also depicts schematically an extractor fan 67', as suction-extraction device, which is effective in respect of the line 32' and forces the outgoing air toward the outside. This produces a negative pressure in the building 1', which allows outside air to flow in constantly through joints in windows and doors. Since this extraneous air is not heated by the fresh-air/outgoing-air system 30' in the winter, it is sought to design the doors and windows with the lowest possible level of sealing losses. In zero-energy houses, frameless windows which cannot be opened are preferred. The extractor fan 67' is assigned an actuating element, e.g. potentiometer, which is arranged in the interior of the building 1' and makes it possible for the rotational speed of the fan 67' to be regulated via a control line. This makes it possible for the air stream to be adjusted in accordance with the immediate requirements.

From the region of the heat accumulator 20', fluid lines 15' lead into said core layer 51, these being indicated schematically at 16'. At a depth of 2 m, the earth, in Central Europe, usually has a temperature of between +7° C. and +9° C. By virtue of the heat accumulator 20' being placed in position, a higher average temperature is reached on account of the geothermics and because energy is fed to said heat accumulator in the summer. Accordingly, the core layer 5' may be fed heat from the accumulator 20' in order for said core layer to be heated up to from +9° C. to +15° C. This produces, in the exterior wall 2', a thermal build-up effect or a temperature distribution which is noticeable for the interior of the building as a reduced heating requirement and which increases the temperature in the interior to a considerable extent.

The fluid lines 16, laid in the core layer 5' can dissipate heat, via the coils 15', to the heat accumulator 20' in the summer. The same applies to the solar absorbers 10', which are preferably connected to the core region 22' of the heat accumulator 20' in order to dissipate excess heat there. It is also possible in this embodiment, in accordance with experience, for the solar absorber 10' to be dispensed with in many cases if the insulation, together with the rest of the introduction of heat in the building and the heat dissipation taking place in the interior, is sufficient and makes it possible to have pleasant interior temperatures.

The invention usefully employs heat energy at a temperature below the room which is to be heated, which appeared not to be possible hitherto.

The invention claimed is:

1. Low-energy house having the following features:
a solar absorber accommodated on or beneath the roof; a heat accumulator arranged beneath or laterally alongside the building; fluid-channeling devices including connecting lines between the solar absorber and the heat accumulator; exterior walls of the building with an outer insulating layer, an inner insulating layer and with a core zone, which is designed as a load-bearing concrete wall; the fluid channelling devices also including fluid lines which are arranged in the core zone and are connected to the solar absorber and the heat accumulator.

2. Low-energy house according to claim 1, wherein the fluid lines of the core zone are connected to the heat accumulator in order for heat to be removed from the exterior walls in the summer and to be fed to the accumulator.

3. Low-energy house according to claim 1, wherein the outer insulating layer is selected to be somewhat thicker than the inner insulating layer, in order for low-temperature heat to be introduced at the optimum location with respect to the characteristic temperature curve which drops from the inside to the outside.

4. Low-energy house according to claim 1, wherein the core zone is designed as a concrete layer with inserts, and in that a dew-point zone is situated within this concrete layer.

* * * * *